United States Patent [19]

Huff

[11] 3,923,906

[45] Dec. 2, 1975

[54] PROCESS FOR THE MANUFACTURE OF 3-HALOGENO-5-HYDROXY-TRICYCLO[2.2.1.0$^{2.6}$]HEPTANES

[75] Inventor: Roger K. Huff, Wokingham, England

[73] Assignee: Ciba-Geigy Corporation, Ardsley, N.Y.

[22] Filed: May 11, 1973

[21] Appl. No.: 359,585

[30] Foreign Application Priority Data

July 3, 1972 Switzerland.......................... 9921/72

[52] U.S. Cl............................................. 260/617 F
[51] Int. Cl.$^2$........................................ C07C 35/22
[58] Field of Search................................ 260/617 F

[56] References Cited
FOREIGN PATENTS OR APPLICATIONS
717,010   10/1954   United Kingdom............. 260/617 F

OTHER PUBLICATIONS

Wagner and Zook, "Synthetic Org. Chem.," p. 109, Wiley, N.Y., N.Y. (1953).

Djerarsi, "Chem. Rev.," Vol. 43, pp. 271 and 272, (1948).

Ziegler, "Justus Liebigs Annalen der Chemie", Vol. 51, pp. 80–119, (1942).

Primary Examiner—Paul M. Coughlan, Jr.
Assistant Examiner—D. B. Springer
Attorney, Agent, or Firm—Luther A. R. Hall

[57] ABSTRACT

New process for the production of 3-halogen-5-hydroxy-tricyclo[2.2.1.0$^{2.6}$]heptanes is disclosed by which said heptanes can be obtained in a pure form and with high yields.

2 Claims, No Drawings

PROCESS FOR THE MANUFACTURE OF 3-HALOGENO-5-HYDROXY-TRICYCLO[2.2.1.0²,⁶]HEPTANES

The present invention relates to a new process for the manufacture of 3-halogeno-5-hydroxy-tricyclo-[2.2.1.0²,⁶]heptanes.

3-Halogeno-5-hydroxy-tricyclo[2.2.1.0²,⁶]heptanes (3-halogeno-5-hydroxy-nortricyclenes) cannot be prepared in a pure form, and can only be prepared in poor yields, according to known methods. Thus, for example, the reaction of bicyclo[2.2.1]hepta-2,5-diene with hypochlorous acid, or with a reagent forming hypochlorous acid, described in British Patent Specification No. 717,010, yields high proportions of by-products which are difficult to separate off, especially of an unsaturated isomer, alongside the desired 3-halogeno-5-hydroxy-tricyclo[2.2.1.0²,⁶]heptane.

It has now been found that 3-halogeno-5-hydroxy-tricyclo[2.2.1.0²,⁶]heptanes of the formula

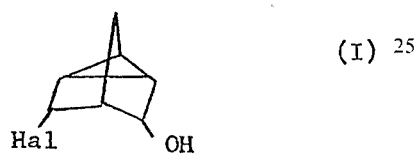

(I)

wherein Hal represents chlorine or bromine can, surprisingly, be prepared in a pure form and with very good yields by reacting bicyclo[2.2.1]hepta-2,5-diene of the formula II

(II)

with a N-halogenosuccinimide of the formula III

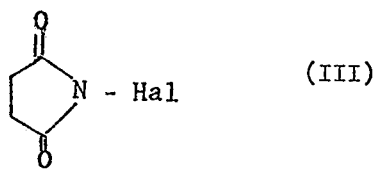

(III)

wherein Hal has the meaning indicated under the formula I, in an aqueous medium.

Preferably, a N-halogenosuccinimide of the formula III, in which Hal represents chlorine, is used in the process according to the invention.

The reaction is advantageously carried out in a mixture of water and a water-miscible organic solvent which is inert under the reaction conditions. Examples of suitable solvents are aliphatic or cycloaliphatic ketones, cyclic ethers or double-sided ethers of monoethylene glycol, diethylene glycol and triethylene glycol, such as acetone, methyl ethyl ketone, cyclopentanone, cyclohexanone, dioxane, tetrahydrofurane, tetrahydropyrane, ethylene glycol dimethyl ether, ethylene glycol diethyl ether, diethylene glycol dibutyl ether and triethylene glycol dimethyl ether.

The reaction temperatures are appropriately between about 0°C and 30°C.

The succinimide liberated during the reaction can be recovered practically quantitatively and can be recycled to the process after halogenation at the nitrogen atom.

The 3-halogeno-5-hydroxy-tricyclo[2.2.1.0²,⁶]heptanes obtained according to the invention can be isolated and purified in the usual manner, for example by extraction with a suitable solvent, such as pentane, hexane or diethyl ether, and subsequent distillation. They are obtained in the form of pale yellowish oils and can, for example, be used as intermediate products for the manufacture of pharmaceutical or agricultural active substances, such as insecticides or fungicides, or — directly or as starting materials — in the synthesis of high boiling stable liquids and plasticisers [compare British Patent Specification No. 717,010].

EXAMPLE 1

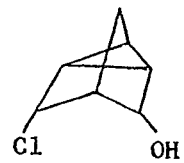

20 g of bicyclo[2.2.1]hepta-2,5-diene are suspended, with vigorous stirring, in a mixture of 100 ml of dioxane or acetone and 100 ml of water. After cooling the resulting suspension to about 25°C, 29 g of N-chlorosuccinimide are slowly added in portions. The reaction mixture is kept at this temperature for 2 hours and is subsequently diluted with approx. 200 ml of water, after which the reaction product is extracted three times with 100 ml of diethyl ether at a time. The ether solution is washed with water and dried over magnesium sulphate and the solvent is removed under reduced pressure.

After distillation of the residue, 22 g (70% of theory) of 3-chloro-5-hydroxy-tricyclo[2.2.1.0²,⁶]heptane are obtained in the form of a slightly yellowish oil; boiling point 56°–58°C/0.01 mm Hg; chlorine content: calculated 11.06%; found 11.13%.

IR spectrum (CHCl₃): 3.560, 3,390, 1,290, 1,070, 956, 936, 908, 874, 825 and 810 cm⁻¹.

NMR spectrum (CDCl₃):
δ = trans 4.46 (t,1H), 3.96 (t,1H), 1.0–1.8 (m,6H) ppm, cis 3.84 (t,1H), 3.78 (t,1H), 1.0–1.8 (m,6H) ppm.

EXAMPLE 2

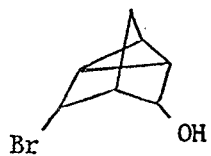

If, in Example 1, 39 g of N-bromosuccinimide are used instead of 29 g of N-chlorosuccinimide, otherwise employing the same procedure, working up the reaction product as described in Example 1 yields 24 g (60% of theory) of 3-bromo-5-hydroxy-tricyclo[2.2.1.0²,⁶]heptane; boiling point 73°–76°C/0.01 mm Hg; bromine content: calculated 42.26%; found 44.64%.

IR spectrum (CHCl₃): 3,600, 3,450, 1,310, 1,285, 1,165, 1,070, 1,045, 1,030, 932, 872, 822 and 810 cm⁻¹.

NMR spectrum (CDCl₃):

δ = trans 4.56 (t,1H), 3.99 (t,1H), 3.96 (t,1H), 3.90 (t,1H), cis 1.2–2.2 (m,6H) ppm.

What I claim is:

1. An improved process for the manufacture of 3-halogen-5-hydroxy-tricyclo[2.2.1.0$^{2,6}$]heptanes of the formula.

Hal    OH where Hal represents chlorine or bromine wherein bicyclo[2.2.1]hepta-2,5-diene is reacted with hypohalous acid or a reagent forming a hypohalous acid in an aqueous organic medium at 0° to 30°C temperature and the product is isolated by extraction and distillation wherein the improvement comprises employing, based on bicyclo[2.2.1]hepta-2,5-diene, essentially an equimolar amount of N-chlorosuccinimide or N-bromosuccinimide as said reagent forming a hypohalous acid, and carrying out the reaction in said aqueous organic medium consisting of a 50:50 by volume of mixture of water: dioxane or water: acetone.

2. The process of claim 1 wherein the N-halogenosuccinimide is N-chlorosuccinimide.

* * * * *